United States Patent
Julia

[11] 3,876,673
[45] *Apr. 8, 1975

[54] INTERMEDIATES USEFUL IN THE SYNTHESIS OF VITAMIN A

[75] Inventor: Marc Julia, Paris, France

[73] Assignee: Rhone-Poulenc S.A., Paris, France

[ * ] Notice: The portion of the term of this patent subsequent to Dec. 25, 1990, has been disclaimed.

[22] Filed: Dec. 29, 1972

[21] Appl. No.: 319,673

Related U.S. Application Data
[62] Division of Ser. No. 169,114, Aug. 4, 1971, Pat. No. 3,748,347.

[30] Foreign Application Priority Data
Aug. 5, 1970    France ............................. 70.28906

[52] U.S. Cl. .............................................. 260/413
[51] Int. Cl. ............................................. C08h 17/36
[58] Field of Search ..................................... 260/413

[56] References Cited
UNITED STATES PATENTS
3,781,313  12/1973  Marc ................................... 260/402
FOREIGN PATENTS OR APPLICATIONS
45-33360  10/1970  Japan .................................. 260/413
45-32684  10/1970  Japan .................................. 260/413

OTHER PUBLICATIONS
Corey et al., J.A.C.S., 87, 1345–1353, 1965.

Primary Examiner—Lewis Gotts
Assistant Examiner—Ethel G. Love
Attorney, Agent, or Firm—Stevens, Davis, Miller & Mosher

[57] ABSTRACT

Sulphones of the formula:

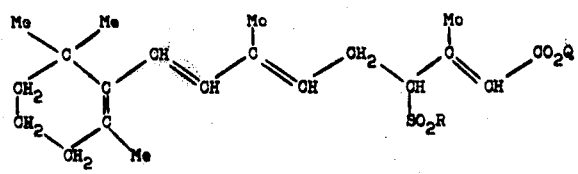

in which R is aryl and Q is hydrogen or a hydrocarbon radical, which are made by reacting, preferably at low temperature, a halide of the formula:

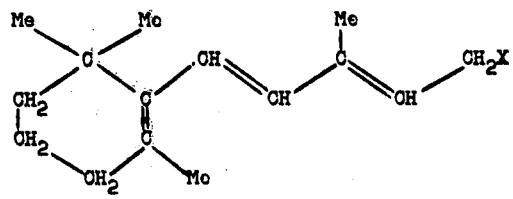

and a sulphone of the formula:

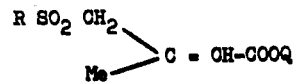

are useful intermediates for producing vitamin A into which they may be converted by saponification, desulphonation, and reduction.

1 Claim, No Drawings

INTERMEDIATES USEFUL IN THE SYNTHESIS OF VITAMIN A

This is a division, of application Ser. No. 169,114, filed Aug. 4, 1971, now U.S. Pat. No. 3,748,347.

The present invention relates to intermediates useful in the synthesis of vitamin A.

The present invention provides, as new compounds useful as intermediates in the synthesis of vitamin A, the sulphones of the formula:

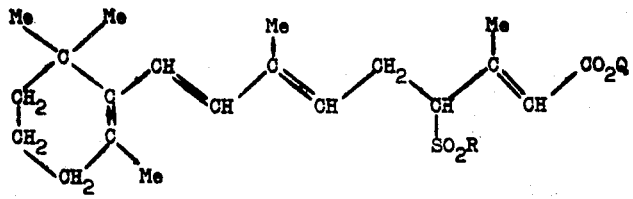

I in which R represents an aryl radical and Q represents a hydrogen atom or a monovalent hydrocarbon radical. R can in particular represent naphthyl, phenyl or alkylphenyl, in which the alkyl is preferably of 1 to 4 carbon atoms, such as p-toluyl. Q can be, for exampple, an alkyl, cycloalkyl, aryl or aralkyl radical, but is preferably an alkyl radical of 1 to 4 carbon atoms, such as methyl or ethyl.

The sulphones of formula I are obtained in accordance with a feature of the invention by reaction of a halide of the formula:

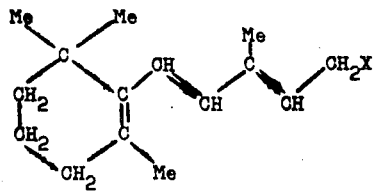

II in which X represents a chlorine, bromine or iodine atom, with a sulphone of the formula:

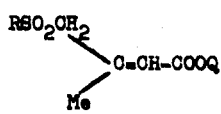

III in which R and Q have the meanings given above. It is to be understood that the formulae I and III do not necessarily represent sterically pure products, but can represent mixtures of cis and trans isomers.

The reaction of the halide of formula II with the sulphone of formula III is preferably carried out at between −40° and 0°C., and usually at between −35° and −25°C. It is advantageous to carry out the reaction in the presence of a solvent, especially an ether, such as tetrahydrofuran or dioxane, or another aprotic polar solvent, such as dimethylformamide, dimethylsulphoxide, hexamethylphosphorylamide or N-methylpyrrolidone. Generally, the process is carried out in the presence of an acceptor, e.g. an alkali metal butylate, for the hydrogen halide liberated. Usually, a solution of the halide of formula II is slowly added to the mixture of the other constituents of the reaction mixture. After the reaction and after the usual preliminary purification treatments, the sulphone of formula I may be isolated in the pure state, for example by chromatography.

The halide of formula II may be obtained by halogenation of vinyl-β-ionol with a phosphorus trihalide.

The sulphones of formula III which are new compounds, may be obtained by reaction of an alkali metal sulphinate of formula $RSO_2M$, in which M represents an alkali metal, with a γ-halogenosenecioate of a monovalent hydrocarbon radical, which is in turn obtainable by halogenation of the corresponding senecioate with an N-halogenosuccinimide, for example by bromination with N-bromosuccinimide.

Desulphonation of the sulphones of formula I in which Q represents hydrogen, yields the acid of formula

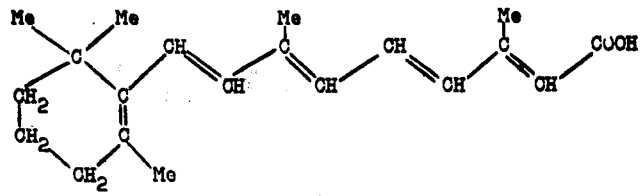

As is already known, reduction of the terminal carboxyl radical of this acid to give a hydroxymethyl radical —$CH_2OH$ yields vitamin A. When Q in the sulphone of formula I is initially a hydrocarbon radical, the latter is first replaced by hydrogen by saponification.

The Example which follows illustrates the invention.

EXAMPLE

Potassium t-butylate (6.9 g.) in tetrahydrofuran (40 cc.), followed by the sulphone (16.5 g. - 0.06 mol) of formula:

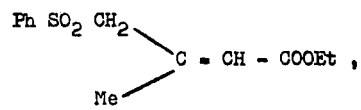

are introduced, at 20°C., into a three-neck flask of 250 cc. capacity, equipped with a mechanical stirrer. A homogeneous blood-red solution (carbanion formation) is thus obtained.

The whole is cooled to −30°C. and a solution of 21.7 g. of a product containing 80 percent of the bromide of formula:

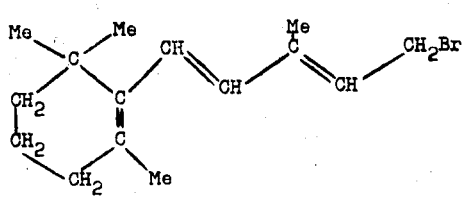

IV in anhydrous tetrahydrofuran (25 cc.) is added dropwise at the same temperature.

After the addition, the temperature is allowed to rise to 20°C. again, stirring is continued for a further 6 hours at 20°C., and the mixture is left to stand for 15 hours. The greater part of the tetrahydrofuran is evaporated in vacuo and the reaction mixture is taken up in water. The neutral fraction and the acid fraction are separated in the usual manner. The neutral fraction (36.9 g.) is a red oil containing 37 percent of products of formula:

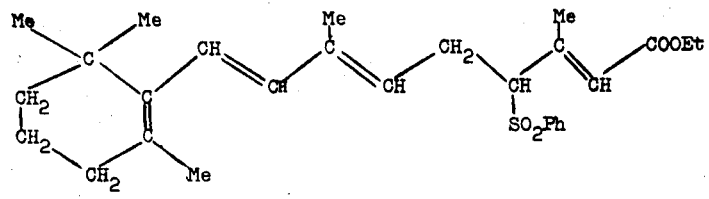

This sulphone-ester (13.6 g.) is isolated by chromatography on a silica column.

The initial starting materials were synthesized as follows:

a. The 80 percent pure bromide of formula IV was obtained by bromination of vinyl-β-ionol (2.2 g. - 0.01 mol) of the formula:

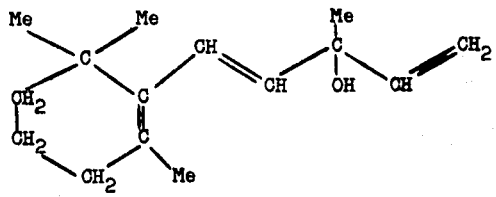

are introduced into a flask equipped with a stirrer. The whole is cooled to −35°C. with stirring and a mixture of anhydrous diethyl ether (1 cc.) and phosphorus tribromide (0.9 g.) is added dropwise with stirring. When the addition is complete, stirring is continued for a further 30 minutes at −35°C., and the temperature is then allowed to rise to 0°C., again and is kept at 0°C. for 1 hour, with continued stirring.

The ether phase is decanted, the residue is washed with diethyl ether, and the ether layers are combined and washed with an ice-cold solution of sodium bicarbonate. The aqueous layer is extracted with diethyl ether and the ether layer is rapidly washed with ice-cold water; the combined ether layeyrs are dried over magnesium sulphate. After evaporation of the ether at 0°C., a crude bromide (2.17 g.), containaing 80 percent of the bromide of formula IV, is obtained. The yield of the bromide of formula IV is thus 60 percent based on the vinyl-β-ionol introduced. This bromide is not stable in the pure state and at ambient temperature. It is desirable therefore to store it in solution in diethyl ether under nitrogen at a temperature below 0°C.

b. Ethyl γ-(phenylsulphonyl)senecioate was prepared by reaction of sodium phenylsulphinate, $PhSO_2Na$, with ethyl γ-bromosenecioate.

Sodium phenylsulphinate (16.4 g., 0.1 mol) is dissolved in anhydrous methanol (35 cc.) in a three-neck flask equipped with a mechanical stirrer. Ethyl γ-bromosenecioate (20.7 g., 0.1 mol) is added dropwise at 20°C. A yellow precipitate appears. After completion of the addition, the mixture is stirred for a further 10 minutes. The methanol is distilled off and progressively replaced by an equal volume of water. After cooling, the aqueous phase is extracted with diethyl ether and the organic layers are combined. The whole is washed with water and then dried over magnesium sulphate. After evaporation of the solvent, ethyl γ-(phenylsulphonyl)senecioate (24.75 g.) (92% yield) is obtained as a practically colourless liquid.

Ethyl γ-bromosenecioate (mixture of cis and trans isomers) was prepared by bromination of ethyl senecioate with N-bromosuccinimide, in a yield of 67 percent based on the N-bromosuccinimide, by the method described by I. AHMAD et al. J. Chem. Soc. 1958 C 185 to 187.

The final sulphone-ester of formula I, in which R represents a phenyl radical and Q represents an ethyl radical, can be used as follows:

10 g. of this sulphone-ester (0.021 mole)
20 cc. of 96 percent ethanol and 3.5 g. of potassium hydroxyde (0.064 mole) are kept at boiling temperature under reflux for two hours. After cooling the acid fraction (6.4 g.) is separated in the usual manner. By recrystallization of this acid fraction in petrol ether, 73 mg. of vitamine A acid of formula

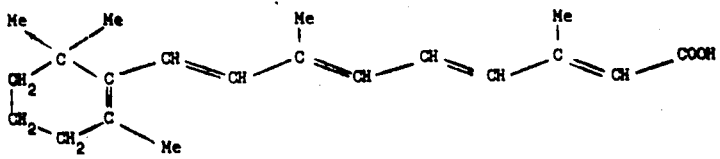

are obtained (mp. : b 177°-179°C) (12% yield).

I claim:

1. Process for the preparation of vitamin A acid which comprises desulphonating a sulphone of the formula:

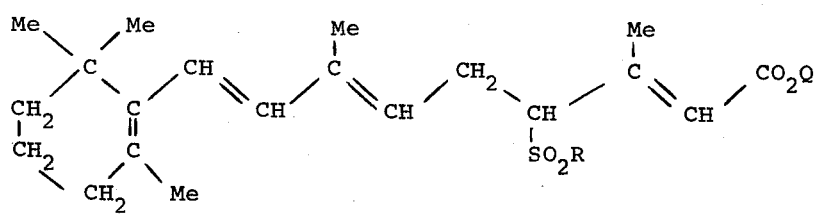
in which R represents an aryl radical and Q represents hydrogen or alkyl of 1 to 4 carbon atoms, by treatment with alkali, the said desulphonation being accompanied by saponification when Q is alkyl of 1 to 4 carbon atoms.
* * * * *